Oct. 18, 1938.　　　　G. E. HENDERSON　　　　2,133,388
STOCK WATERING TANK HEATER
Filed Sept. 2, 1936　　　　2 Sheets-Sheet 1

Inventor
George E. Henderson.
By Henry Silberis and
Herbert S. Nonneman
his Attorneys Oct. 18, 1938.  G. E. HENDERSON  2,133,388
STOCK WATERING TANK HEATER
Filed Sept. 2, 1936    2 Sheets-Sheet 2
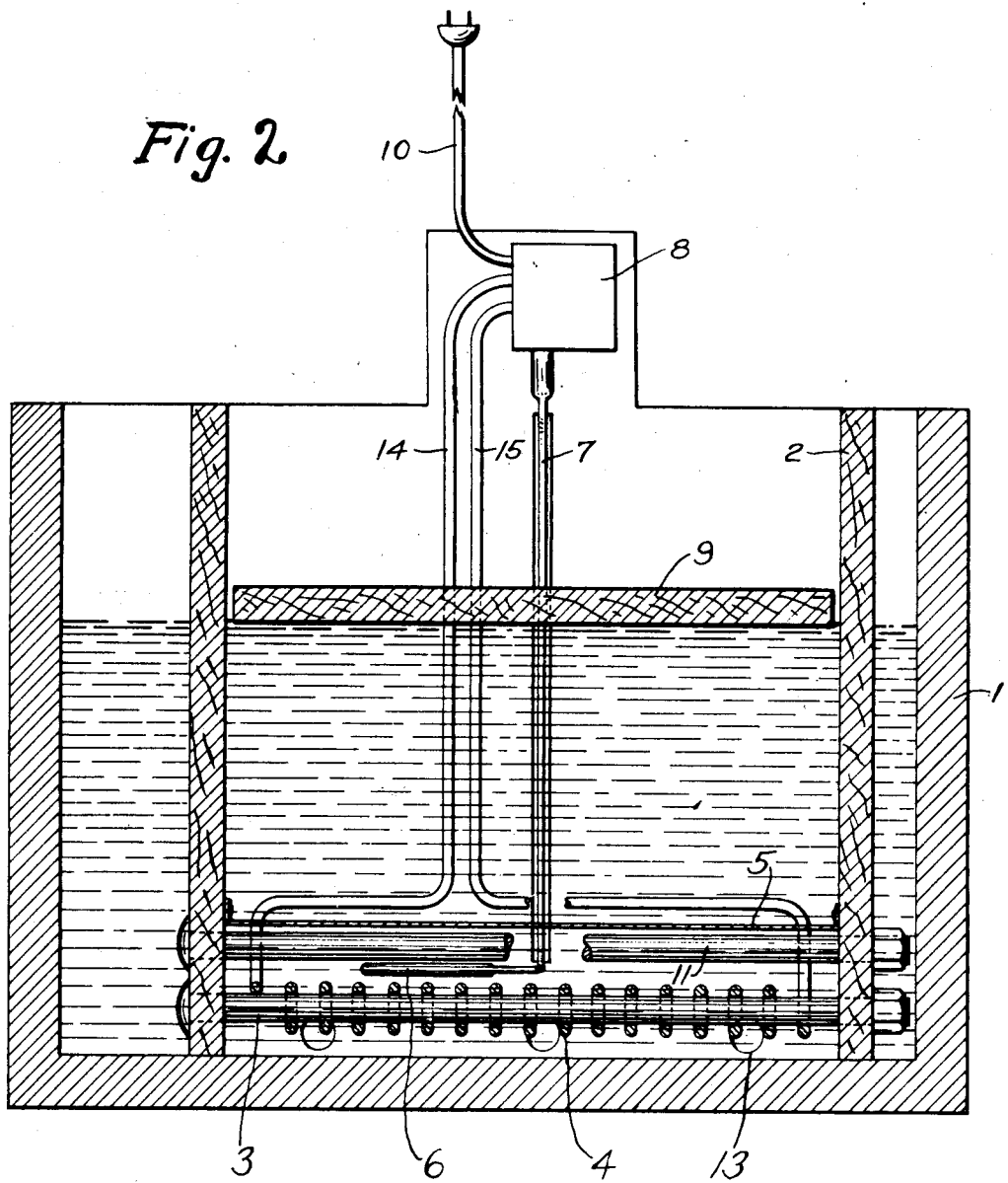
Inventor
George E. Henderson.
By Henry Silbereis and
Herbert A. Norman
his Attorneys Patented Oct. 18, 1938

2,133,388

UNITED STATES PATENT OFFICE 2,133,388

STOCK WATERING TANK HEATER

George E. Henderson, Wilmington, Ohio

Application September 2, 1936, Serial No. 99,063

4 Claims. (Cl. 219—38)

This invention relates to a water heater which is applicable for use in conjunction with water tanks used particularly on the farm for the purpose of watering stock.

It is an object of this invention to provide a device which, when used in combination with a stock water tank, will maintain water at a temperature above the freezing point.

A specific object of this invention is to construct such a heating device so that it will provide a sufficient supply of drinking water at all times by confining the heating of the water within a limited portion of the tank and thus reduce heat loss to a minimum and therefore providing as economical a method of heating water as possible.

A specific object of the invention is to provide in a large watering tank, suitable for watering animals such as horses, cows and other live stock, a relatively small compartment within the large tank, and an electrical heating element to heat only the water within the small compartment. This arrangement provides an improved and economical combination since only the necessary amount of water is maintained at the proper temperature.

A further object is to provide an electric heating element in direct contact with the water in the small compartment, thus providing even greater economy in heating the water in the small compartment.

With these and incidental objects in view, the invention consists of certain novel features of construction and combination of parts, the essential elements of which are set forth in the appended claims and a preferred form or embodiment of which is hereafter described with reference to the drawings which accompany and form a part of this specification.

Of said drawings:

Fig. 2 is a vertical section of the assembly taken approximately on the line 2—2 of Fig. 1.

General description

Figure 1:
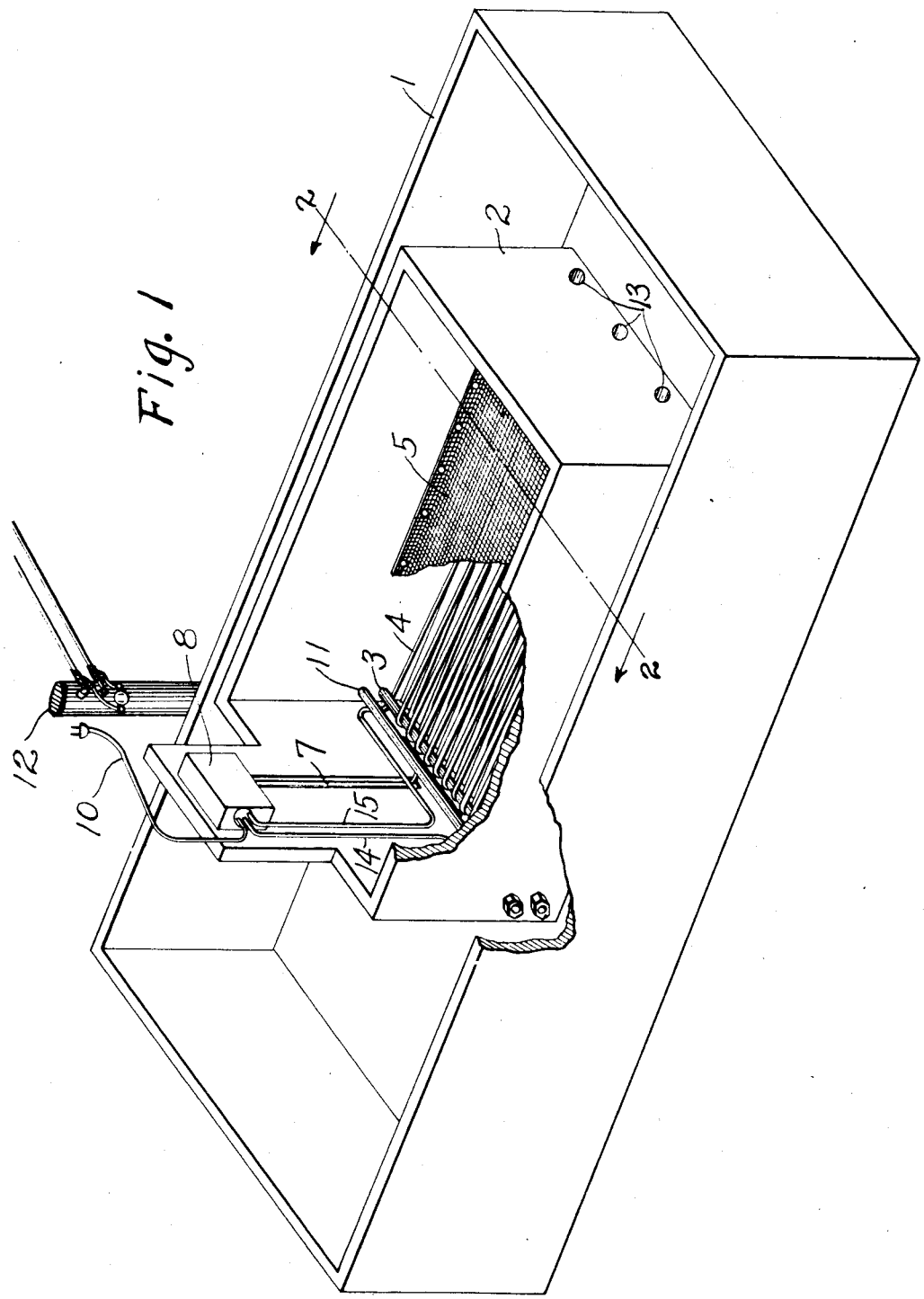
Fig. 1 is a perspective view of a stock watering tank showing the heater placed in position, parts being cut away to reveal the internal characteristics.

The prevention of water from freezing in a common stock watering tank during the cold winter months is a considerable problem to many livestock producers. Lack of sufficient water at a desirable temperature results in much loss to farmers annually thru lowered milk production, retarded fattening and impaired health to livestock in general.

In the past many methods have been devised to prevent water from freezing. Most of these methods were uneconomical, presented a fire hazard and in the main required considerable attention.

In order to overcome these disadvantages encountered in the past in a device of this nature, I have provided a practical heater for a watering tank which will heat a sufficient amount of water with the chill removed to meet the needs of live stock at all times.

My apparatus consists generally of a small compartment placed inside the large tank proper. Electric heating elements are mounted at the bottom of the small compartment so that water entering from the tank proper passes directly over these heating elements thus having the chill removed. However, the temperature of the water is regulated by means of a thermostat so that the heating of the water inside the compartment can be continued to any predetermined temperature by simply regulating the thermostat.

By spreading the heating elements across the bottom of the small compartment practically all the water comes in contact with the heating elements as it passes up thru the compartment. The heating elements being of low heat density per square inch of surface, prevent the accumulation of lime or other material on them should the water being used, be of a particularly high degree of hardness. The sides of the small compartment are made of an insulation material to prevent as much heat loss as possible. Also to prevent loss of heat thru the exposed surface at the top of the heater, a float of insulating material is inserted which acts more or less as a lid.

This lid floats freely on the surface of the water and the livestock soon learn to push it down when drinking out of the small compartment. It can also be removed when it is desired to remove some of the water from the compartment for other purposes. With the use of the heater, it is possible to apply heat to only a portion of the water in a tank at one time, thereby eliminating a large amount of heat loss. The remainder of the water will tend to freeze over solid at low temperatures. No longer is it necessary to chop holes through the ice for the stock to drink thru. With water in the tank frozen solid there is a tendency of further insulating of the entire device.

A detailed description of one form of the device to accomplish the above mentioned objects and functions follows:

*Detail description*

A large tank 1 (Fig. 1) of any suitable material is provided having the desired capacity. It is not intended to limit the invention to the relative sizes shown in the drawings since the tank 1 can be of any size in proportion to the inside compartment. A relative small compartment 2, made of insulating material, is placed inside the tank 1, the compartment 2 being of such size as to meet the demands of the live stock to be watered. The compartment 2 is made of insulating material to prevent an excessive loss of heat, thus making it easier and more economical to control the temperature of the water.

To prevent further loss of heat a float 9 (Fig. 2), of insulating material, is provided. The float lies freely on the surface of the water and the live stock soon learn to push it down when drinking water out of the compartment. The float also acts as a protection to prevent foreign matter from dropping into the compartment.

A wire screen 5 is mounted above the heating element to protect the heating element from any foreign matter that may fall into the tank.

A rod 3 (only as being shown in the drawings), is mounted at each end of the compartment, near the bottom thereof, to support the heating elements 4. The heating element 4 can be constructed of a number of individual elements mounted on rod, 3, or they can be made of a single strand of material looped back and forth on the rods 3. As shown in Fig. 1 the heating elements are looped back and forth over the rods 3 and have leads 14 and 15 connecting them to a terminal within a box 8, which also contains a thermostat mechanism to operate the switch. A supply line 10 leads from the thermostatically controlled switch within the box 8, and can be plugged into a supply line mounted on a suitable support, such as part 12.

A thermostat bulb 6, or other heat sensitive element, is mounted underneath a rod 11 (Fig. 2) supported by the compartment 2, and directly over the heating elements. A tube 7 connects the bulb 6 with the thermostat mechanism within the box 8, to control the thermostat, and switch the electricity on and off as controlled by the temperature of the water within the tank.

The tube 7 is set in a recess of the compartment to provide protection against accidental damage thereto.

A series of openings 13 is provided at each end of the compartment 2 to permit free flow of the water from the tank into the heating compartment.

From the above it is obvious that only the water in the insulated compartment 2 is heated, and that this compartment can be made any size required by immediate needs of the live stock, thus making it unnecessary to heat more water than required. This makes the arrangement economical in operation and use.

Having thus described my invention, what I claim is:—

1. In a stock watering tank open at the top to give access to the water by the stock, the combination of a heat insulated water chamber having an unobstructed opening at the top, said chamber resting on the bottom of the tank, supports adjacent the bottom of the chamber, a cable, comprising an insulated heating element mounted on the supports and extending horizontally throughout the length of the chamber, said cable being in direct contact with the water, and a thermostat to control the heating element.

2. In a stock watering tank open at the top to give access to the water by the stock, the combination of a heat insulated chamber open at the top, said chamber resting on the bottom of the tank, supports near the bottom of the chamber, a single strand of insulated heating medium wound back and forth between and on the supports extending horizontally along the bottom of the chamber, openings in the chamber for the free flow of water into the chamber past and around the heating medium, and a thermostat to control the heating medium.

3. In a stock watering tank open at the top to give access to the water by the stock, the combination of a heat insulated chamber open at the top, said chamber resting on the bottom of the tank, supports near the bottom of the chamber, a single strand of heating medium wound back and forth between and on the supports extending horizontally along the bottom of the chamber, a protecting screen mounted above the heating medium extending between and mounted on the inside walls of the chamber near the bottom thereof, said screen being perforated for the free flow of water upward into position for access by the stock, openings in the chamber for the free flow of water into the chamber past and around the heating medium and thru the screen, and a thermostat to control the heating medium.

4. In a stock watering tank open at the top to give access to the water by the stock, the combination of a heat insulated water chamber having an unobstructed opening at the top, said chamber resting on the bottom of the tank, supports adjacent the bottom of the chamber, a heating element mounted on the supports and extending horizontally throughout the length of the chamber, a imperforated heat insulated float within the chamber to reduce heat loss from the water through the unobstructed opening at the top of the chamber, and a thermostat to control the heating element.

GEORGE E. HENDERSON.